United States Patent
Huber et al.

(10) Patent No.: US 11,355,999 B2
(45) Date of Patent: Jun. 7, 2022

(54) METHOD FOR COOLING AN ELECTRICAL MACHINE, AND AN ELECTRICAL MACHINE APPLYING THE METHOD

(71) Applicant: Bayerische Motoren Werke Aktiengesellschaft, Munich (DE)

(72) Inventors: Andreas Huber, Schoenberg (DE); Thinh Nguyen-Xuan, Erding (DE); Klaus Vollmer, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 16/445,370

(22) Filed: Jun. 19, 2019

(65) Prior Publication Data

US 2019/0305643 A1 Oct. 3, 2019

Related U.S. Application Data

(63) Continuation of application No. PCT/EP2018/050854, filed on Jan. 15, 2018.

(30) Foreign Application Priority Data

Jan. 24, 2017 (DE) .................. 10 2017 201 117.3

(51) Int. Cl.
*H02K 9/19* (2006.01)
*H02K 9/193* (2006.01)
(Continued)

(52) U.S. Cl.
CPC ................ *H02K 9/19* (2013.01); *H02K 9/00* (2013.01); *H02K 9/193* (2013.01); *H02K 7/116* (2013.01);
(Continued)

(58) Field of Classification Search
CPC .......... H02K 7/116; H02K 9/19; H02K 9/193; H02K 9/00; H02K 9/02; H02K 9/04; H02K 9/08; H02K 9/16
(Continued)

(56) References Cited

U.S. PATENT DOCUMENTS 3,353,043 A * 11/1967 Albright .................. H02K 9/28
 310/61
9,985,500 B2 * 5/2018 Rippel .................... H02K 9/197
(Continued)

FOREIGN PATENT DOCUMENTS

CN 2184287 Y 11/1994
CN 104362800 A 2/2015
(Continued)

OTHER PUBLICATIONS

Neudorfer et al., English Machine Translation of EP0660492, Cooling System for a Motor (Year: 1995).*
(Continued)

*Primary Examiner* — Rashad H Johnson
(74) *Attorney, Agent, or Firm* — Crowell & Moring LLP

(57) ABSTRACT

A method for cooling an electrical machine includes the following steps: guiding a coolant in an axial coolant supply line which is arranged in the rotor shaft, and conducting the coolant into an interior chamber of the electrical machine via a radial coolant supply line which is connected in a coolant-conducting manner to the axial coolant supply line. The electrical machine has an axial coolant supply line and at least one radial coolant supply line connected in a coolant-conducting manner to the axial coolant supply line, both of which are arranged in the rotor shaft. An interior chamber of the electrical machine is connected in a coolant-guiding manner to the radial coolant supply line.

20 Claims, 1 Drawing Sheet

(51) Int. Cl.
*H02K 9/00* (2006.01)
*H02K 7/116* (2006.01)
*H02K 9/02* (2006.01)
*H02K 9/04* (2006.01)
*H02K 9/16* (2006.01)
*H02K 9/08* (2006.01)

(52) U.S. Cl.
CPC .............. *H02K 9/02* (2013.01); *H02K 9/04* (2013.01); *H02K 9/08* (2013.01); *H02K 9/16* (2013.01)

(58) Field of Classification Search
USPC ........................................ 310/52, 54, 64, 89
See application file for complete search history.

(56) References Cited

U.S. PATENT DOCUMENTS

| | | | | |
|---|---|---|---|---|
| 10,027,195 | B2* | 7/2018 | Jeong | H02K 9/19 |
| 10,916,992 | B2* | 2/2021 | Yamaguchi | H02K 5/20 |
| 11,022,112 | B2* | 6/2021 | Yamaguchi | F04C 2/10 |
| 2007/0273228 | A1* | 11/2007 | Tanaka | F16C 19/54 |
| | | | | 310/90 |
| 2008/0024020 | A1* | 1/2008 | Lund | B60L 1/02 |
| | | | | 310/61 |
| 2008/0272661 | A1 | 11/2008 | Zhou et al. | |
| 2011/0140551 | A1* | 6/2011 | Adaniya | H02K 9/197 |
| | | | | 310/64 |
| 2012/0299404 | A1* | 11/2012 | Yamamoto | H02K 1/32 |
| | | | | 310/61 |
| 2013/0038151 | A1* | 2/2013 | Ohashi | H02K 5/1737 |
| | | | | 310/59 |
| 2013/0076169 | A1* | 3/2013 | Pal | H02K 9/19 |
| | | | | 310/59 |
| 2013/0313928 | A1* | 11/2013 | McKinzie | H02K 9/19 |
| | | | | 310/54 |
| 2014/0125165 | A1* | 5/2014 | Miyamoto | H02K 9/19 |
| | | | | 310/54 |
| 2016/0164377 | A1* | 6/2016 | Gauthier | H02K 9/19 |
| | | | | 310/54 |
| 2016/0233744 | A1 | 8/2016 | Kaneshige et al. | |
| 2016/0344247 | A1 | 11/2016 | Jeong et al. | |
| 2017/0237318 | A1* | 8/2017 | Arndt | H02K 1/32 |
| | | | | 310/55 |
| 2019/0273420 | A1* | 9/2019 | Yasuda | H02K 3/24 |

FOREIGN PATENT DOCUMENTS

| | | |
|---|---|---|
| CN | 104806742 A | 7/2015 |
| CN | 105871099 A | 8/2016 |
| DE | 10 2007 003 457 A1 | 8/2008 |
| DE | 10 2012 022 452 A1 | 5/2014 |
| DE | 10 2015 224 034 A1 | 11/2016 |
| EP | 0 660 492 A1 | 6/1995 |
| EP | 3 032 709 A1 | 6/2016 |
| EP | 3 068 021 A1 | 9/2016 |
| EP | 3 109 973 A1 | 12/2016 |
| WO | WO 2016/159860 A1 | 10/2016 |

OTHER PUBLICATIONS

Sun et al., English Machine Translation of CN104362800A (Year: 2015).*
Chen et al., English Machine Translation of CN104806742A (Year: 2015).*
German-language Search Report issued in counterpart German Application No. 10 2017 201 117.3 dated Aug. 29, 2019 with partial English translation (12 pages).
International Search Report (PCT/ISA/210) issued in PCT Application No. PCT/EP2018/050854 dated Apr. 10, 2018 with English translation (six (6) pages).
German-language Written Opinion (PCT/ISA/237) issued in PCT Application No. PCT/EP2018/050854 dated Apr. 10, 2018 (seven (7) pages).
Chinese-language Office Action issued in Chinese Application No. 201880004590.1 dated Jul. 3, 2020 with English translation (19 pages).
Chinese-language Office Action issued in Chinese Application No. 201880004590.1 dated Mar. 24, 2022 with English translation (16 pages).

* cited by examiner

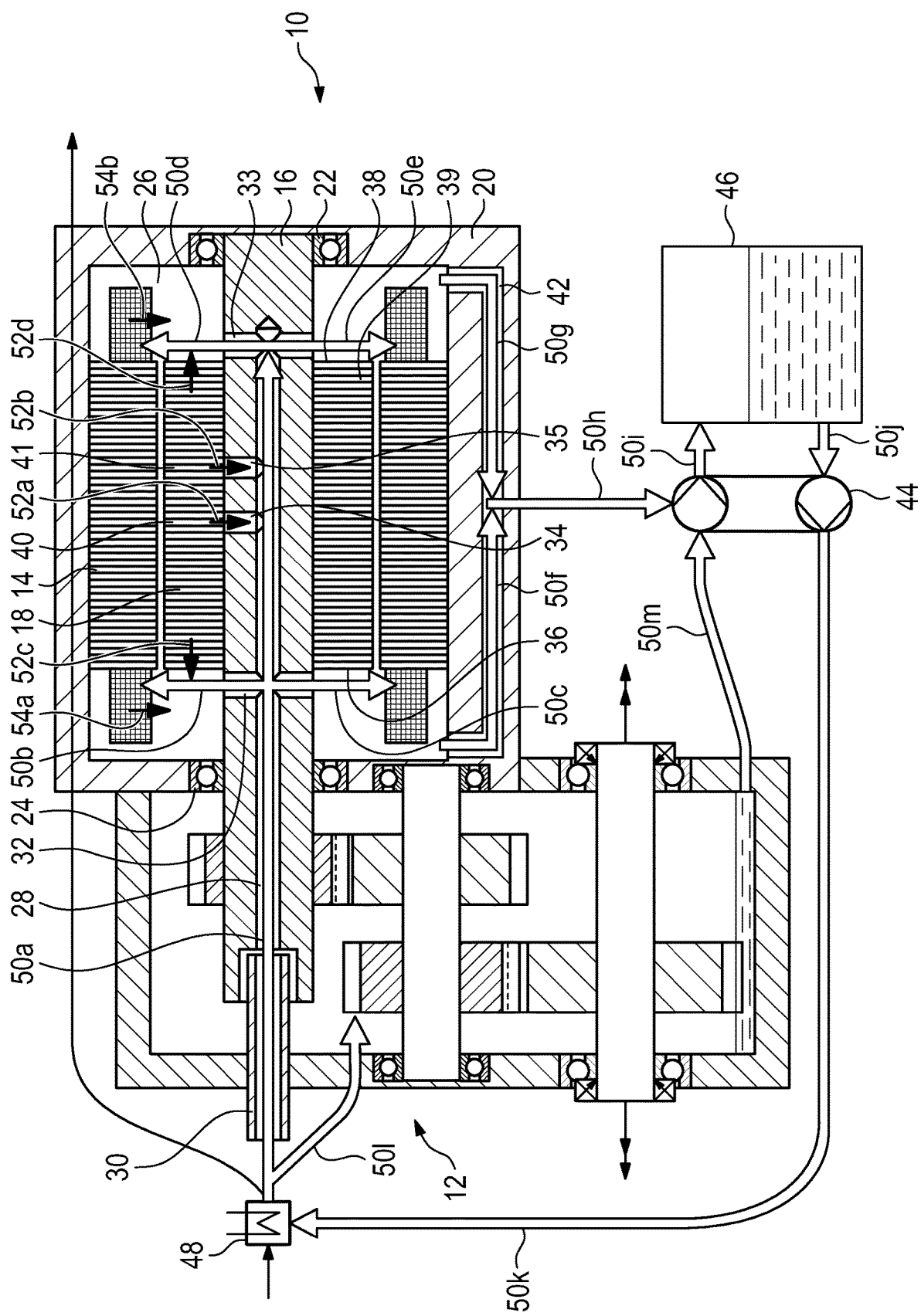

METHOD FOR COOLING AN ELECTRICAL MACHINE, AND AN ELECTRICAL MACHINE APPLYING THE METHOD

CROSS REFERENCE TO RELATED APPLICATIONS

This application is a continuation of PCT International Application No. PCT/EP2018/050854, filed Jan. 15, 2018, which claims priority under 35 U.S.C. § 119 from German Patent Application No. 10 2017 201 117.3, filed Jan. 24, 2017, the entire disclosures of which are herein expressly incorporated by reference.

BACKGROUND AND SUMMARY OF THE INVENTION

The invention relates to a method for cooling an electrical machine having a rotor arranged on a rotor shaft for rotation therewith, and having a stator.

Furthermore, the invention relates to an electrical machine having the rotor arranged on the rotor shaft for rotation therewith, and the stator.

It is known from the prior art that the performance of electrical machines, in particular of electric motors, depends on the temperature. Electrical machines are therefore frequently cooled, wherein the cooling can be realized in the form of air cooling or liquid cooling. In an electrical machine, it is important in particular to cool the stator and the rotor.

In the area of liquid cooling, what is referred to as lance cooling, which is described, for example, in US 2008/0272661 A1, is widespread. In the case of lance cooling, the rotor shaft is designed as a hollow shaft which is open on one side. A pipe called a "cooling lance" is inserted into the hollow shaft in such a manner that the cooling lance does not rotate with the rotor shaft. The cooling fluid then flows via said pipe into the hollow shaft and out of the latter again via an annular space between the hollow shaft and the cooling lance. It is advantageous here that the rotor shaft has to be accessible only from one side.

It is the object of the invention to improve the liquid cooling of electrical machines, in particular of electric motors, wherein an overall improvement, in particular, is achieved. The intent is preferably for good heat removal from the rotor and the stator to be ensured, as a result of which a low temperature level in the rotor and the stator is achieved.

The invention achieves these objectives by a method for cooling an electrical machine having a rotor arranged on a rotor shaft and having a stator, wherein the method includes the following steps:
a) guiding a coolant in an axial coolant supply line which is arranged in the rotor shaft, and
b) introducing the coolant into an interior chamber of the electrical machine where a radial coolant supply line which is connected in a coolant-conducting manner to the axial coolant supply line and is arranged in the rotor shaft, wherein at least the rotor is arranged in the interior chamber.

The interior chamber of the electrical machine is bounded here by a housing of the electrical machine. The axial coolant supply line and the radial coolant supply line are preferably designed as bores. The axial coolant supply line is either a blind bore or a through bore which is closed on one side. Owing to the fact that the coolant is present in the interior chamber of the electrical machine, the coolant can interact directly with those components of the electrical machine that are to be cooled. Short and low-resistant heat conducting parts are therefore realized between those locations and/or components of the electrical machine that are to be cooled ("hot spots") and the coolant. Furthermore, the effective heat transmission surface between the components of the electrical machine and the coolant is significantly increased in comparison to lance cooling. A relatively low temperature level can therefore be achieved in the electrical machine and, in particular, in the rotor. As a result, a higher continuous output of the electrical machine is possible. On account of the lower temperature level, use can be made of magnets which are more cost-effective with the performance of the electrical machine remaining the same. This is true in particular for permanently excited synchronous machines, current-excited synchronous machines and asynchronous machines.

The electrical machine is preferably an electric motor.

An electrically non-conducting coolant, in particular an oil, preferably a transmission oil, is preferably used. The coolant, if it comes into direct contact with current-conducting components of the electrical machine, therefore cannot impair the operability of the electrical machine. In particular, the coolant does not bring about any short circuit. As a result, the coolant can be brought particularly close to those locations and/or components of the electrical machine that are to be cooled, and the heat can be removed from there. If an oil is used, the coolant can also be used simultaneously for cooling and/or lubricating other components of the electrical machine or components connected thereto. If a transmission oil is used, sealing between the electrical machine and a transmission coupled to the latter can be omitted. A simple design of a drive unit comprising such an electrical machine is produced. Furthermore, oil or transmission oil can be handled relatively advantageously and simply.

According to one embodiment, a laminated rotor core of the rotor and/or at least one end side of the rotor is/are acted upon with coolant. As a result, the heat arising in the rotor is particularly efficiently absorbed from the coolant and transported away. This results in good coolability of the rotor in which a relatively low temperature level can then be set.

In an advantageous manner, during a rotational movement of the rotor, the coolant in the interior chamber and/or in the radial coolant supply line is transported radially to the outside by centrifugal force. By rotation of the rotor, a suction effect is produced in the radial coolant supply line and therefore on the other rotating component. The coolant is therefore always recirculated and thus protected from overheating. Since the radial coolant supply line is connected in a coolant-conducting manner to the axial coolant supply line, the suction effect also has a reactive effect on the latter. The suction effect of the rotor here can relieve a coolant pump arranged outside the electrical machine of load, and therefore said coolant pump can be dimensioned to be smaller and lighter.

The coolant can be transported through the rotor or along at least one end side of the rotor. If the rotor consists of a plurality of rotor laminations, i.e. as what is referred to as a laminated rotor, the coolant can be conveyed between the individual rotor laminations by the centrifugal force which is generated by the rotating rotor. The coolant can be conveyed here in particular axially through between the individual rotor laminations. The same applies for the end sides of the rotor. The coolant can also flow through a rotor winding. This thus results in a coolant flow through the rotor, which ensures reliable and efficient removal of heat. The coolant is guided here directly or very close to the locations to be cooled.

In one variant, coolant is transmitted from the rotor, preferably transmitted portion by portion, onto the stator. The stator and in particular the winding heads of the stator are therefore also cooled. Stated in simplified form, coolant sprays from the rotor onto the stator when the rotor rotates. Oil spray cooling of the stator can be referred to here. Coolant is therefore applied directly onto the stator, as a result of which heat can be removed from the latter in a simple and effective manner. A low temperature level in the stator, in particular in the stator winding heads, thus results.

Furthermore, the coolant can be guided in a coolant circuit, wherein preferably a coolant cooler is arranged in the coolant circuit. The coolant cooler is preferably located here outside the electrical machine. It extracts heat from the coolant before the coolant is introduced again into the electrical machine. A closed coolant circuit can thus be realized. In addition, the temperature level in the electrical machine can be influenced via the cooling power of the coolant cooler. In particular, a particularly low temperature level can be ensured in the electrical machine by an efficient coolant cooler.

In addition, the coolant can be used for cooling and/or lubricating a bearing of the rotor. The coolant is therefore used for a plurality of tasks, which leads to a simple and cost-effective design of the electrical machine. In addition, in this case, seals between the bearing of the rotor and the interior chamber to be cooled can be omitted. The efficiency of the electrical machine is thereby improved since the frictional resistance of the seals is inapplicable.

Furthermore, the object is achieved by an electrical machine of the type mentioned at the beginning, wherein an axial coolant supply line and at least one radial coolant supply line connected in a coolant-conducting manner to the axial coolant supply line are arranged in the rotor shaft, and an interior chamber of the electrical machine is connected in a coolant-guiding manner to the radial coolant supply line. Since coolant can therefore be located in the interior chamber of the electrical machine, a wet electrical machine, in particular a wet electric motor, can also be referred to. The interior chamber of the electrical machine is preferably bounded here by a housing of the electrical machine.

The axial coolant supply line and the radial coolant supply line are preferably designed as bores. The axial coolant supply line is either a blind bore or a through bore which is closed on one side. The same advantages and effects which have already been explained with regard to the method according to the invention are thus achieved.

In one configuration variant, a plurality of radial coolant supply lines which are preferably radially continuous are arranged in the rotor shaft, wherein in particular two, four, six or eight coolant supply lines are arranged. The number of coolant supply lines can be adapted here to the application present in each case. A plurality of openings are thus produced via which coolant can flow out into the interior chamber of the electrical machine. Four to sixteen such openings are preferably produced. Uniform and effective cooling of the electrical machine is then possible.

At least two of the radial coolant supply lines can be arranged axially outside the rotor in each case on the outer side on opposite axial sides of the rotor, in particular are arranged adjacent to axial end sides of the rotor. The coolant can therefore be applied in a targeted manner onto the axial end sides of the rotor, as a result of which the rotor is effectively cooled.

In a development of the invention, an electrically non-conducting coolant, preferably an oil, in particular a transmission oil, is arranged in the axial coolant supply line, in the radial coolant supply line and/or in the interior chamber. Reference is made to the effects and advantages explained with regard to the method according to the invention.

The rotor can be designed as a laminated rotor, and the radial coolant supply line can be connected in a coolant-conducting manner to at least one lamination intermediate space of the laminated rotor, wherein preferably a plurality of radial coolant supply lines are connected in a coolant-conducting manner to a plurality of respectively assigned lamination intermediate spaces. In the case of a laminated rotor, the rotor core consists of a stack of laminations. As a result, low eddy current losses arise in the rotor. By introduction of the coolant into the lamination intermediate space, the interior of the rotor is cooled. As a result, the cooling is particularly effective and a low temperature level can be achieved in the rotor.

In one embodiment, the rotor is arranged in the interior chamber, wherein preferably the stator is also arranged in the interior chamber. As a result, by means of the coolant present in the interior chamber of the electrical machine, the stator and the winding heads of the stator can also be effectively cooled.

The axial and the radial coolant supply line can be designed as components of a coolant circuit which preferably comprises a coolant cooler.

The axial coolant supply line, the rotor, the stator and/or a bearing of the rotor are preferably arranged in pairs in a coolant-permeable manner with respect to one another. Said components can therefore be cooled by a common coolant. Mutual sealing is not necessary here.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 schematically shows an electrical machine according to an embodiment of the invention with which a method for cooling an electrical machine can be carried out.

DETAILED DESCRIPTION OF THE DRAWING

FIG. 1 shows a drive unit with an electrical machine 10 which is designed in the example illustrated as an electric motor, and a transmission 12 connected to said electrical machine.

The electrical machine 10 comprises a stator 14 and a rotor 18 arranged on a rotor shaft 16 for rotation therewith. The rotor shaft 16 is mounted rotatably here in a housing 20 via a first bearing 22 and a second bearing 24.

Both the stator 14 and the rotor 18 are arranged in an interior chamber 26 of the housing 20.

For the cooing of the electrical machine 10, an axial coolant supply line 28 which, in the embodiment illustrated, is designed as a blind bore is arranged in the rotor shaft 16. The coolant supply line 28 is connected in a coolant-conducting manner to a coolant inlet stub 30 via which said coolant supply line is supplied with coolant.

Furthermore, the rotor shaft 16 comprises a first radial coolant supply line 32, a second radial coolant supply line 33, a third radial coolant supply line 34 and a fourth radial coolant supply line 35.

The first radial coolant supply line 32 and the second radial coolant supply line 33 are radially continuous here.

The radial coolant supply lines 32-35 are connected in a coolant-conducting manner to the axial coolant supply line 28 and in a coolant-guiding manner to the interior chamber 26.

The first radial coolant supply line 32 is arranged axially outside the rotor 18 in such a manner that it borders the outer side of an axial end side 36 of the rotor 18. The second radial coolant supply line 33 is arranged on an opposite side of the rotor 18 in such a manner that it borders the outer side of an opposite end side 38 of the rotor 18.

In the embodiment illustrated, the rotor 18 is designed as a laminated rotor. The rotor 18 therefore comprises a laminated rotor core 39 consisting of a plurality of laminations.

The third and fourth radial coolant supply lines 34, 35 are arranged here in such a manner that they are connected in a coolant-conducting manner to in each case one lamination intermediate space 40, 41 of the laminated rotor 18.

An electrically non-conductive coolant which, in the embodiment illustrated, is a transmission oil is guided in the axial coolant supply line 28 and the radial coolant supply lines 32-35 and also in the interior chamber 26. The coolant is not illustrated specifically.

The axial coolant supply line 28 and the radial coolant supply lines 32-35 are parts of a coolant circuit which also comprises a coolant sump 42, a coolant pump 44, a coolant reservoir 46 and a coolant cooler 48.

The course of the coolant through the coolant inlet stub 30 and the axial coolant supply line 28 are illustrated by an arrow 50a. The course of the coolant through the first radial coolant supply line 32 is depicted by arrows 50b and 50c, the course of the coolant through the second radial coolant supply line 33 by arrows 50d and 50e.

The path of the coolant through the third and fourth coolant supply line 34, 35 is not illustrated in detail, but takes place analogously to the arrows 50b and 50d.

The axial coolant supply line 28, the rotor 18, the stator 14, the bearing 22 and/or the bearing 24 are therefore each arranged in pairs in a coolant-permeable manner with respect to one another.

The draining of the coolant via the coolant sump 42 is symbolized by arrows 50f and 50g and the connecting line between the coolant sump 42 and the coolant pump by an arrow 50h.

An inlet and an outlet of the coolant reservoir 46 are illustrated by arrows 50i and 50j.

The coolant-conducting connection of the coolant pump 44 to the coolant cooler 48 is illustrated by an arrow 50k.

Since the coolant in the embodiment illustrated is a transmission oil, the drive unit also comprises a coolant line which connects the coolant cooler 48 to the transmission 12. Said coolant line is illustrated by an arrow 50l.

The coolant line by means of which the coolant is introduced from the transmission 12 into the coolant pump 44 is symbolized by an arrow 50m.

The cooling of the electrical machine 10 takes place as follows.

First of all, the coolant is introduced via the coolant inlet stub 30 into the axial coolant supply line 28. From there, it is introduced via the radial coolant supply lines 32-35 into the interior chamber 26 of the electrical machine, in which interior chamber the rotor 18 and the stator 14 are arranged.

Via the radial coolant supply lines 32-35, the end sides 36, 38 of the rotor 18 and also the laminated rotor core 39 of the rotor 18, more precisely the lamination intermediate spaces 40 and 41, are acted upon with coolant.

When the rotor 18 rotates, the coolant is transported radially outward by a centrifugal force arising because of the rotational movement.

This applies in particular to the coolant present in the radial coolant supply lines 32-35. The coolant present in the radial coolant supply lines 34, 35 is transported radially outward through the rotor 18. Heat is transmitted here from the rotor 18 to the coolant, which is illustrated by arrows 52a, 52b.

The coolant present in the radial coolant supply lines 32 and 33 is transported radially outward via the end sides 36, 38. Heat is likewise transmitted here from the rotor 18 to the coolant. This is symbolized by arrows 52c and 52d.

In addition, during rotation of the rotor 18, coolant is transmitted from the rotor 18 to the stator 14. This preferably takes place portion by portion, for example by coolant being sprayed from the rotor 18 onto the stator 14.

The coolant can then absorb heat from the stator 14. This is depicted by arrows 54a and 54b.

The coolant is also used for cooling and/or lubricating the bearings 22, 24.

Finally, the coolant is supplied via the coolant sump 42 and the coolant pump 44 to the coolant cooler 48. The coolant is then introduced again via the coolant inlet stub 30 into the rotor shaft 16. The coolant circuit is therefore closed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for cooling an electrical machine having a rotor arranged on a rotor shaft for rotation therewith, and having a stator, the method comprising the steps of:
   a) guiding a coolant expelled via an expelled coolant line of a transmission of the electrical machine to a coolant pump that supplies the coolant in parallel to both an input coolant line of the transmission and to an axial coolant supply line arranged in the rotor shaft, wherein the axial coolant supply line is introduced to the rotor shaft via a coolant inlet stub at least partially disposed within the transmission and axially aligned with the rotor shaft; and
   b) introducing the coolant into an interior chamber of the electrical machine via a radial coolant supply line which is connected in a coolant-conducting manner to the axial coolant supply line and is arranged in the rotor shaft, wherein
      at least the rotor is arranged in the interior chamber,
      the rotor comprises a laminated rotor core comprising a stack of individual rotor laminations,
      the radial coolant supply line is disposed substantially in axial alignment with at least one lamination intermediate space disposed between the individual rotor laminations of the stack, and
      the coolant introduced into the interior chamber of the electrical machine via the radial coolant supply line is conveyed through the at least one lamination intermediate space.

2. The method according to claim 1, wherein the coolant is an electrically non-conducting coolant.

3. The method according to claim 2, wherein the coolant is a transmission oil.

4. The method according to claim 1, wherein
the laminated rotor core of the rotor and/or at least one end side of the rotor are acted upon with the coolant.

5. The method according to claim 1, wherein
during a rotational movement of the rotor, the coolant in the interior chamber and/or in the radial coolant supply line is transported radially outward by centrifugal force.

6. The method according to claim 5, wherein
the coolant is transported through the rotor or along at least one end side of the rotor.

7. The method according to claim 6, wherein
the coolant is transmitted from the rotor onto the stator.

8. The method according to claim 1, wherein
the coolant is guided in a coolant circuit.

9. The method according to claim 8, wherein
a coolant cooler is arranged in the coolant circuit.

10. The method according to claim 1, wherein
the coolant is used for cooling and/or lubricating a bearing of the rotor.

11. An electrical machine, comprising:
a rotor arranged on a rotor shaft for rotation therewith;
a stator;
a coolant pump to supply coolant in parallel to both an input coolant line of a transmission and to an axial coolant supply line arranged in the rotor shaft, wherein the axial coolant supply line is introduced to the rotor shaft via a coolant inlet stub at least partially disposed within the transmission and axially aligned with the rotor shaft;
at least one radial coolant supply line connected in a coolant-conducting manner to the axial coolant supply line;
an expelled coolant line connected in the coolant-conducting manner via the coolant pump to the axial supply line and the input coolant line to convey expelled coolant from the transmission of the electrical machine; and
an interior chamber of the electrical machine connected in a coolant-guiding manner to the at least one radial coolant supply line, wherein
the rotor comprises a laminated rotor core comprising a stack of individual rotor laminations, and
the radial coolant supply line is disposed substantially in axial alignment with at least one lamination intermediate space disposed between the individual rotor laminations of the stack.

12. The electrical machine according to claim 11, wherein
a plurality of radial coolant supply lines are arranged in the rotor shaft.

13. The electrical machine according to claim 12, wherein
either two, four, six or eight radial coolant supply lines are provided.

14. The electrical machine according to claim 12, wherein
at least two of the radial coolant supply lines are arranged axially outside the rotor on an outer side on opposite axial sides of the rotor.

15. The electrical machine according to claim 11, wherein
an electrically non-conducting coolant is arranged in the axial coolant supply line, in the radial coolant supply line and/or in the interior chamber.

16. The electrical machine according to claim 11, wherein
the rotor is arranged in the interior chamber.

17. The electrical machine according to claim 16, wherein
the stator is also arranged in the interior chamber.

18. The electrical machine according to claim 11, wherein
the axial coolant supply line and the radial coolant supply line are components of a coolant circuit which comprises a coolant cooler.

19. The electrical machine according to claim 11, wherein
the axial coolant supply line, the rotor, the stator and/or a bearing of the rotor are arranged in a coolant-permeable manner with respect to one another.

20. A method for cooling an electrical machine having a rotor arranged on a rotor shaft for rotation therewith, and having a stator, the method comprising the steps of: a) guiding a coolant in an axial coolant supply line which is arranged in the rotor shaft, wherein the axial coolant supply line is introduced to the rotor shaft via a coolant inlet stub at least partially disposed within a transmission and axially aligned with the rotor shaft; and b) introducing the coolant into an interior chamber of the electrical machine via a radial coolant supply line which is connected in a coolant-conducting manner to the axial coolant supply line and is arranged in the rotor shaft, wherein at least the rotor is arranged in the interior chamber, the rotor comprises a laminated rotor core comprising a stack of individual rotor laminations, the radial coolant supply line is disposed substantially in axial alignment with at least one lamination intermediate space disposed between the individual rotor laminations of the stack, and the coolant introduced into the interior chamber of the electrical machine via the radial coolant supply line is conveyed through the at least one lamination intermediate space.

* * * * *